United States Patent [19]
Friesinger et al.

[11] Patent Number: 5,648,638
[45] Date of Patent: Jul. 15, 1997

[54] LOW-TEMPERATURE CURRENT TRANSFER STRUCTURE WITH HEAT EXCHANGER

[75] Inventors: Günter Friesinger, Eggenstein-Leopoldshafen; Reinhard Heller, Ludwigshafen; Heinrich Katheder, Linkenheim-Hochstetten, all of Germany

[73] Assignee: Forschungszentrum Karlsruhe GmbH, Karlsruhe, Germany

[21] Appl. No.: 199,568

[22] Filed: Feb. 22, 1994

Related U.S. Application Data

[63] Continuation-in-part of PCT/DE92/00700, Aug. 21, 1992.

[30] Foreign Application Priority Data

Aug. 22, 1991 [DE] Germany ............... 41 27 711.2

[51] Int. Cl.$^6$ ................................. H01B 12/00
[52] U.S. Cl. ................... 174/15.4; 62/51.1; 505/885
[58] Field of Search ................. 174/15.1, 15.4, 174/15.5, 125.1; 505/705, 875, 878, 879, 885, 892, 924; 62/51.1; 335/216

[56] References Cited

U.S. PATENT DOCUMENTS

| | | | |
|---|---|---|---|
| 3,610,809 | 10/1971 | Ergenbrod | 174/15.4 |
| 3,654,377 | 4/1972 | Fleming et al. | 174/15.4 |
| 4,134,037 | 1/1979 | Berthet et al. | 174/15.4 X |
| 4,209,658 | 6/1980 | Hilal | 174/15.4 |
| 4,394,634 | 7/1983 | Vansant | 174/15.4 X |

FOREIGN PATENT DOCUMENTS

| | | | |
|---|---|---|---|
| 0150487 | 8/1984 | Japan | 505/875 |
| 0222906 | 12/1984 | Japan | 505/879 |
| 62-25473 | 2/1987 | Japan | 257/663 |

OTHER PUBLICATIONS

Buyanov et al., "A Review of Current Leads for Cryogenic devices", Cryogenics, Apr. 1975, pp. 193–200.

*Primary Examiner*—Hyung S. Sough
*Attorney, Agent, or Firm*—Klaus J. Bach

[57] ABSTRACT

In a low-temperature current transfer structure including a conductor with a cold end for connection to a superconductive component and a warm end for connection to a bus, there are provided heat exchange regions around the conductor at the cold end and a heat exchange region within the conductor at the warm end where the conductor is hollow cylindrical and, in a transition zone, includes passages for conducting coolant from the heat exchange regions around the conductor to the heat exchange region within the hollow conductor at the warm end to which electrical connectors are mounted on the outside. The arrangement permits heating of the coolant within the conductor close to ambient temperature so that no condensation or icing of the structure occurs and no insulation is needed at the connector end. Also the amount of coolant required is reduced so that also cooling equipment requirements are reduced.

4 Claims, 6 Drawing Sheets

LOW-TEMPERATURE CURRENT TRANSFER STRUCTURE WITH HEAT EXCHANGER

This application is a continuation-in-part application of International application PCT/DE92/00700 of 8/21/92 designated to United States, which claims the priority of German application P 41 27 711.2 of 8/22/91.

BACKGROUND OF THE INVENTION

The invention relates to a low-temperature current transfer structure which includes a heat exchanger and which has a cold end to which a supercooled, that is, a superconductive component, is connected and an opposite warm end to which cables or current busses are connected. At the cold end, the temperature is close to the absolute zero point while the warm end is at ambient temperature.

With such current transfer structures, high to very high electric currents are supplied to low-temperature superconductive components. The transition from a material of normal conductivity to superconductive material occurs within the current transfer structure.

The current passing through normally conductive material generates heat according to Joule's principle. This heat as well as the heat transmitted from the environment by way of heat transfer has to be removed effectively and reliably so that superconductivity can be maintained. Measures which increase the surface area and a sufficiently large flow of a coolant with good heat capacity are a prerequisite herefor.

The usual designs for low-temperature current transfer structures are such that, at the cold end, the superconductor extends somewhat into the contact area of the current transfer structure and is connected to it there. Above the contact area around the current transfer structure, that is, in the actual heat exchanger area, there are provided surface-enlarging means for the transmission of heat to a coolant flowing therepast. In the normal current transfer structures such surface-enlarging means are, for example, capillaries, wires, filaments, corrugated or rolled metal sheets or wire mesh.

U.S. Pat. No. 3,610,809 discloses a gas-cooled porous electric conductor up to 450 A with nonconstant cross-section. The proposed form for the porous electric conductor is either a spirally gourd metal screen or a stretched or perforated metal sheet exposed to a coolant flow for the removal of heat therefrom.

U.S. Pat. No. 3,654,377 discloses a current conducting arrangement with a two-way conductor used for supplying current to and from a current source in a cooled load structure.

However, with all these methods, electric current transfer from the heat exchange region to the connector at the warm end takes place in an inadequately cooled area where, at the same time, a substantial amount of heat is generated by the resistance of the electric current.

Low-temperature current transfer structures of this type are mentioned in CRYOGENICS, Apr. 1975, page 197 in an article by Yu L. Buyanov et al. (see particularly column 2, fourth paragraph).

In spite of the heat generated there, the coolant is not heated up to ambient temperature because of insufficient heat exchange surface area. This leads to condensation and the formation of ice which detrimentally affects the electric high-voltage strength at those points.

With such current transfer structures substantial efforts are required to prevent the formation of ice in the area of the warm ends thereof. Two basic measures are utilized alternatively or in combination. One is the provision of heating means by which the warm end area is sufficiently heated. The other is the provision of enclosures through which dry gas is conducted. Both measures if used alone or in combination require substantial design efforts and expenses for technical and physical reasons because of the high current flow and potentially high electrical voltages.

It is the object of the present invention to provide a low-temperature current transfer structure with heat exchangers having heat exchange areas at the warm end by which icing of the current supply structure or the coolant conduit during high current operation as well as during low current operation or without current flow is avoided.

SUMMARY OF THE INVENTION

In a low-temperature current transfer structure including a conductor with a cold end for connection to a superconductive component and a warm end for connection to a bus, there are provided heat exchange regions around the conductor at the cold end and a heat exchange region within the conductor at the warm end where the conductor is hollow cylindrical and, in a transition zone, includes passages for conducting coolant from the heat exchange regions around the conductor to the heat exchange region within the hollow conductor at the warm end to which electrical connectors are mounted on the outside. The arrangement permits heating of the coolant within the conductor close to ambient temperature so that no condensation or icing of the structure occurs and no insulation is needed at the connector end. Also the amount of coolant required is reduced so that also cooling equipment requirements are reduced.

The heat exchanger area around the conductor consists of annular perforated discs arranged in spaced relationship and through which the coolant is conducted along the conductor.

The heat exchanger area in the interior of the conductor also consists of perforated discs which are disposed in axially spaced relationship and through which the coolant flows and is further heated up to ambient temperature. At the same time, the connecting area and the transition zone between the connecting area and heat exchanger are well cooled. The discs are disposed in good heat transfer contact with the conductor wall.

The advantages achieved by the invention reside particularly in the fact that the coolant can be heated at the warm end up to ambient temperature without the need for expensive heating means and/or enclosures at the warm end of the low-temperature current supply structure.

An exemplary embodiment of the invention is shown in the accompanying drawings.

DESCRIPTION OF THE PREFERRED

Figure 1A:
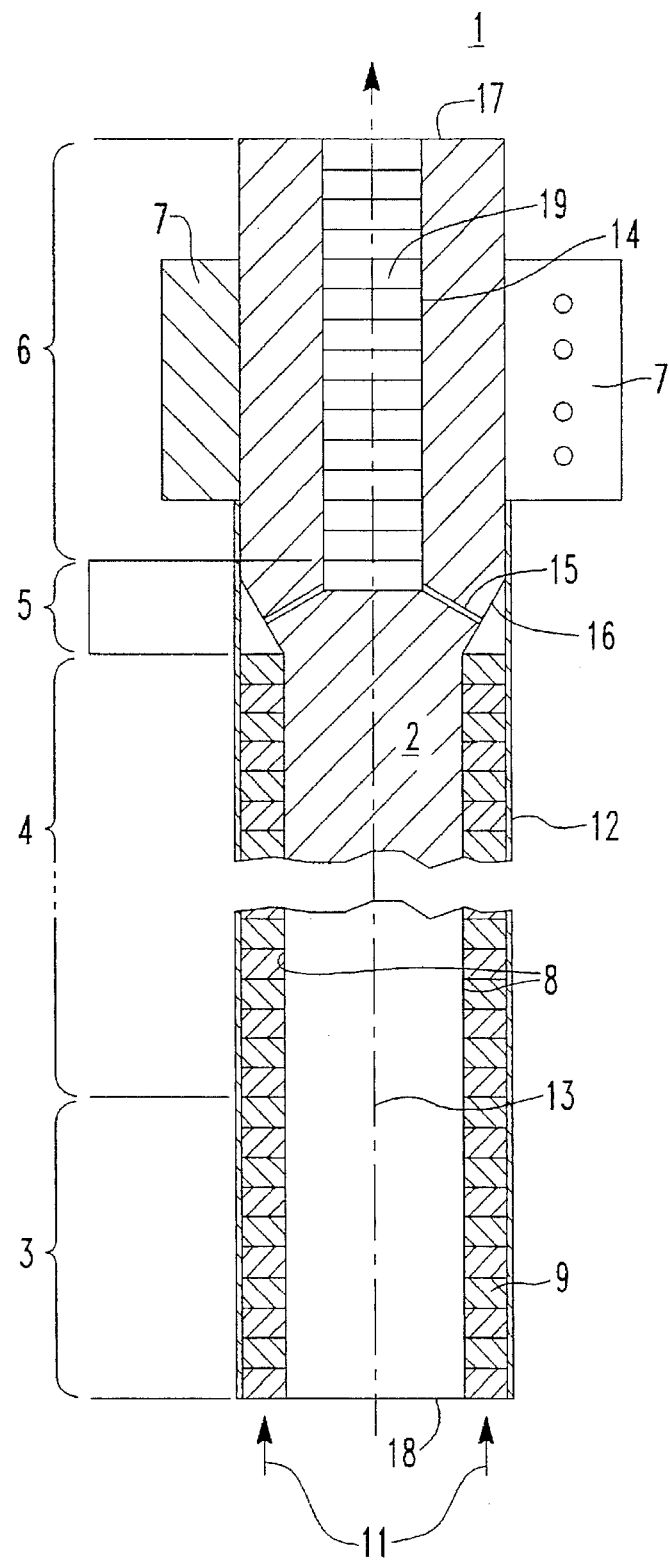
FIG. 1a shows a low-temperature current supply structure with heat exchanger.

The low-temperature current transfer structure for high currents as schematically shown in FIG. 1a consists of the actual conductor 2, a heat transfer region 3 at the cold end, a heat transfer region 4 in an intermediate area, a transition region 5 and a heat transfer region 6 at the warm end. The conductor 2 is cylindrical and has a cross-section selected to accommodate the current to be conducted therethrough. The conductor 2 is in contact with the superconductor in the area of the cold end. The transfer resistance between the two needs to be extremely small. The cylindrical conductor 2 consists, adjacent the cold end 18, of superconductive material and extends through the intermediate area where it consists of normally conductive material such as copper.

At the cold end and in the intermediate area there are two heat exchanger regions 3, 4 disposed around the conductor 2. Heat exchange is achieved by way of annular perforated discs 9 which are in good heat transfer contact with the conductor surface 8. They are, for example, soldered or welded to the surface 8. The discs 9 themselves consist of a material with very good heat conductivity, for example, also copper or a corresponding material. The discs 9 are disposed adjacent one another around the conductor 2 in predetermined distances from one another from the beginning of the cold end up to the transition region 5 and are surrounded by a concentric tube 12 so that the coolant can be conducted from the cold end to and through the intermediate heal transfer area 4 along the conductor surface 8 and through the perforations 10 (FIG. 16) in the discs 9 for the removal of heat therefrom. For low-temperature current transfer structures usually helium is used as coolant. However, depending on the critical temperature of the superconductor also nitrogen or hydrogen may be used as coolant.

In the transition area 5 the outer diameter of the conductor 2 becomes larger providing a truncated cone structure 16 and the conductor becomes hollow-cylindrical up to the warm end 17 and has a wall thickness which depends on the current to be conducted therethrough.

Bores 15 extend through the wall of the conductor 2 in the transition area 5 such that they are directed toward the axis of the hollow cylindrical conductor 14 at the inner end thereof. The conductor crosssection of the hallow cylinder 14 and the transition area 5 is selected such that the reduction of conductor crosssection by the bores 15 for the coolant flow is compensated for and the current density is not undesirably high at this point.

Circular discs 19 are disposed in the hollow cylinder 14 from the transition area 5 up to the warm end 17 in spaced relationship from one another and connected at their circumferences to the inner wall of the hollow cylindrical conductor so as to be in firm contact therewith for good heat transfer. They are, for example, soldered to the inner wall. The discs 19 are also perforated and may consist of the same material as the annular discs 9 of the other two heat exchange regions 3, 4.

While flowing through the bores 15 to and through the inner heat exchanger of the region 6 the coolant is further heated. This is particularly true for the area of the connector 7 since the heat exchange region 6 extends beyond the connector area 7 such that good and predefined cooling effects are achieved particularly in this area.

The current transfer structure 1 is subjected to a continuous rise in temperature From the critical temperature point just above the cold end 18 of the conductor to ambient temperature at its warm end. The conductor 2 and the coolant have almost the same temperature, that is, there is little temperature difference between the two. Only in the area of the transition region 5 the coolant removes somewhat less heat because there, the coolant passes through the bores 15 which have relatively small surface areas. However, the current flow still generates heat there too.

Figure 2A:
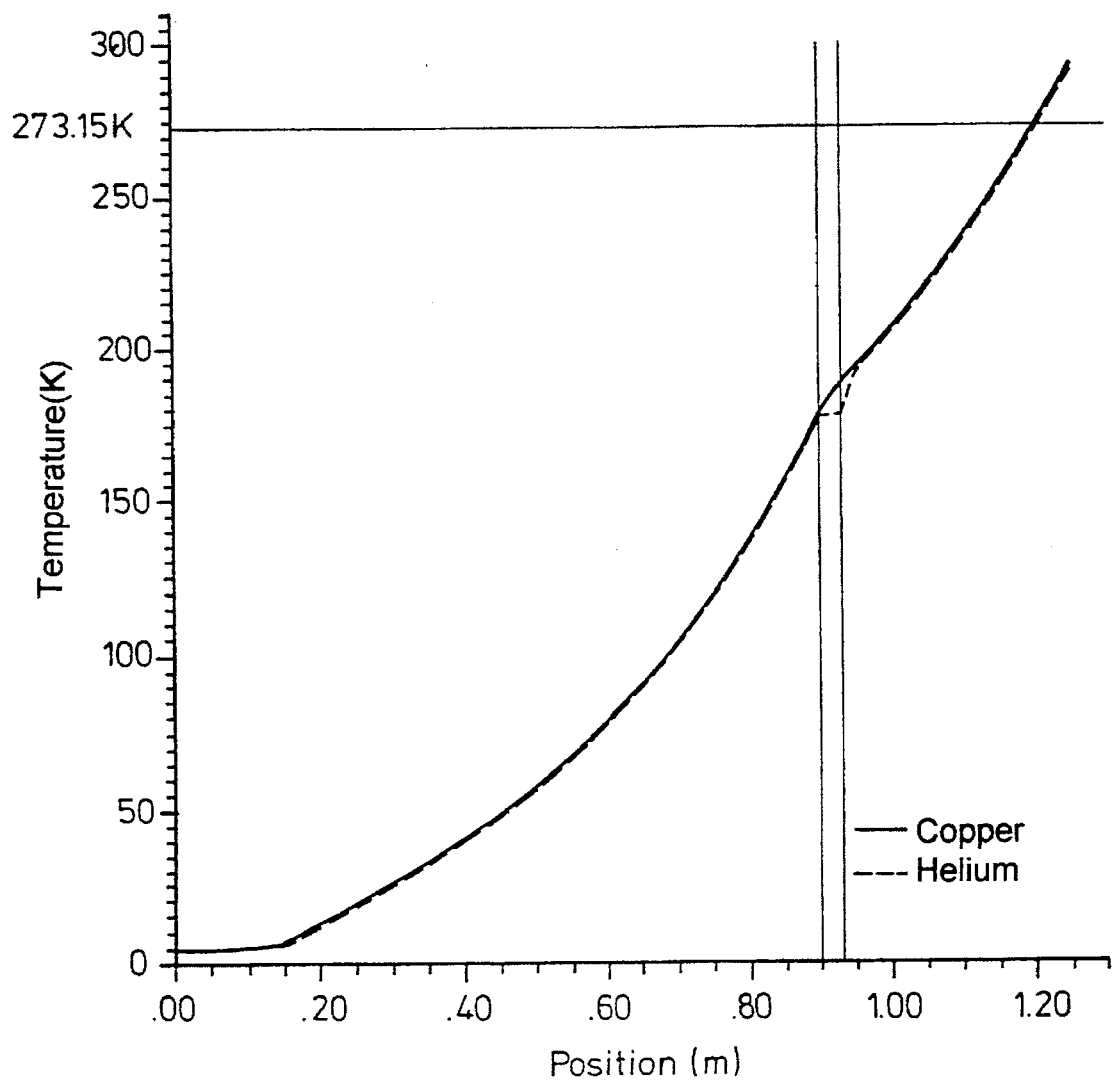
FIG. 2a shows the temperature distribution, without heat exchanger, at the warm end of the current supply structure without any current flowing.
Figure 2B:
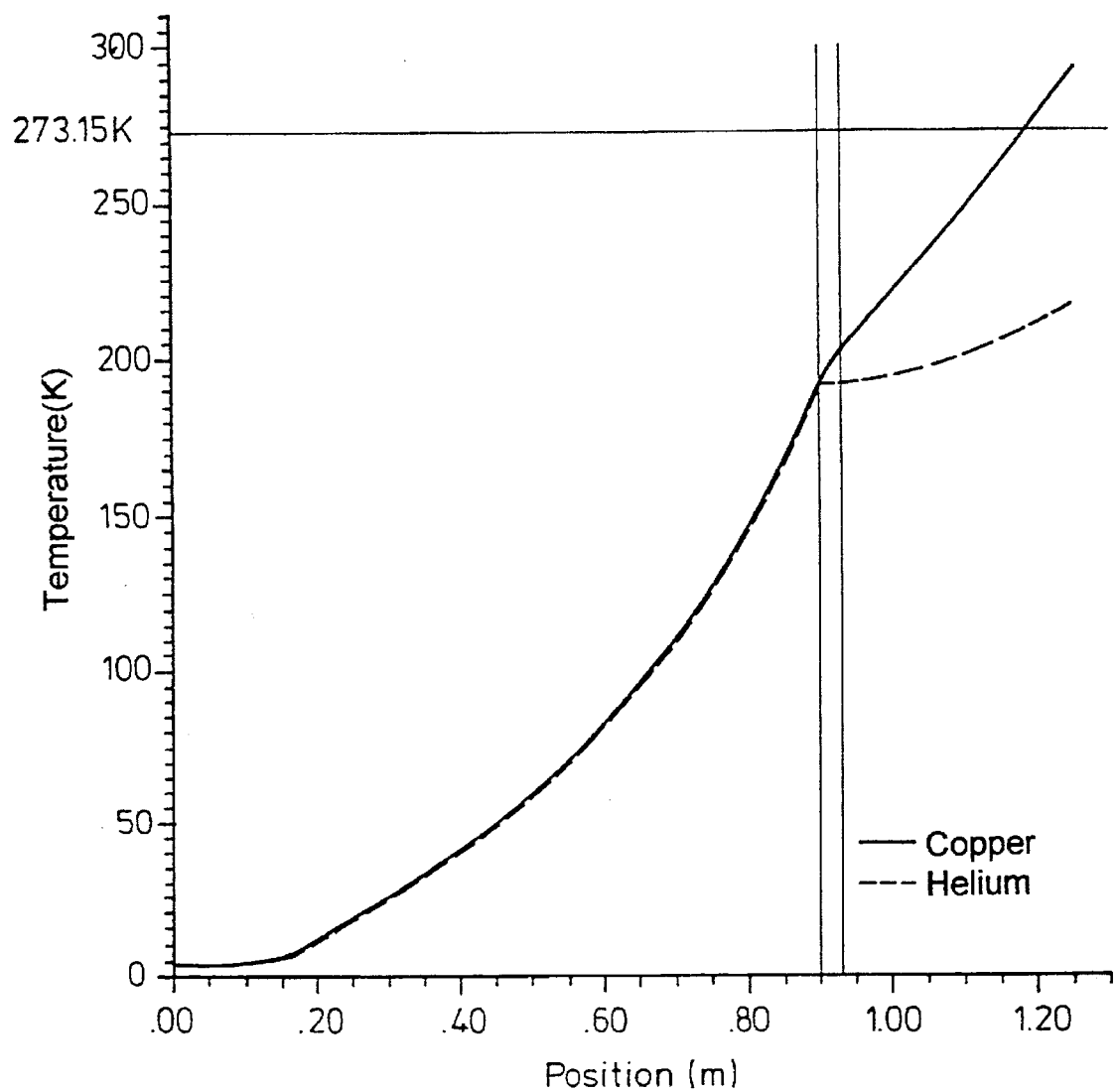
FIG. 2b shows the temperature distribution, with heat exchanger, at the warm end of the current supply structure without any current flowing.

Nevertheless, in the following coolant flow path the coolant temperature is rapidly adjusted closer to the conductor temperature, for example, the copper, by means of the inner heat exchanger or the region 6. The two temperature curves are shown in FIG. 2a for operation without current flowing through the conductor end in FIG. 3a for operation with a current of 50 kA and they demonstrate the advantage achieved by the inner heat transfer region 6. Without heat exchanger in the area or the warm end 17 the temperature values differ more and more from one another beginning at the transition region 5 and up to the warm end 17 as shown in FIG. 2b for operation without current flow and in FIG. 3b for operation with a current of 50 kA. Since normally, the coolant is carried away outside the warm end 17 by means of pipes or flexible thin-walled components, the wall temperature falls easily below the condensation or the freezing point so that the humidity in the air condenses and ice is formed thereon.

Such ice formation on the low-temperature current supply structure is prevented by the arrangement of the heat exchanger within the conductor. Since, upon entering the discharge conduit, the coolant is already heated up close to ambient temperature, the walls of these conduits are also close to ambient temperature or at least above the condensation point of the ambient air so that no condensation or ice can be formed thereon and even the electrical connections in the connector area remain free of icing. This eliminates the need top complicated encapsulations and expensive supplemental heating arrangements in this area. The design of this area can therefore be limited to only really necessary components needed for current conduction, voltage isolation and heat insulation.

Figure 1B:
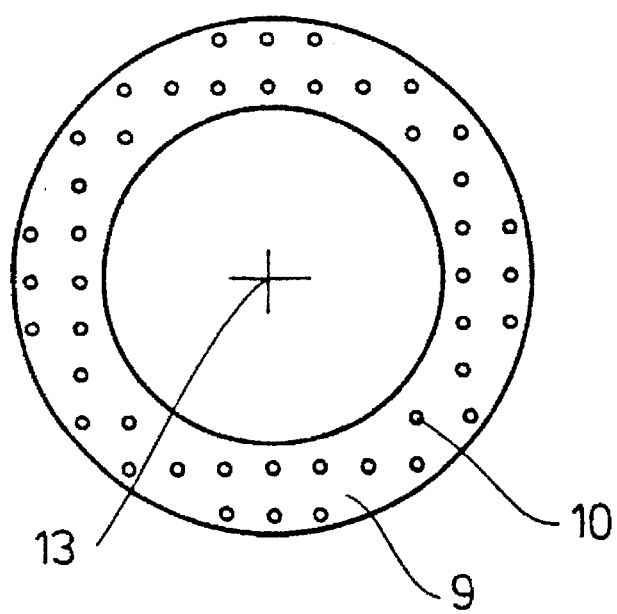
FIG. 1b shows an annular perforated cooling disc.
Figure 1C:
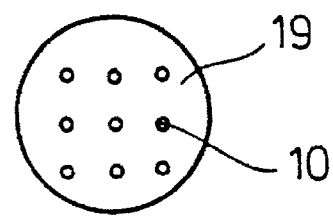
FIG. 1c shows a circular perforated cooling disc.

The arrangement in the heat exchanger regions 3, 4, 6 is of course not limited to the use of perforated discs and not to a hollow cylindrical shape for the conductor. However the use of perforated discs (FIGS. 1b, 1c) which are soldered onto the conductor surface was found to be advantageous and easy to execute. As already mentioned other surface increasing measures can be utilized if they are found suitable.

Figure 3A:
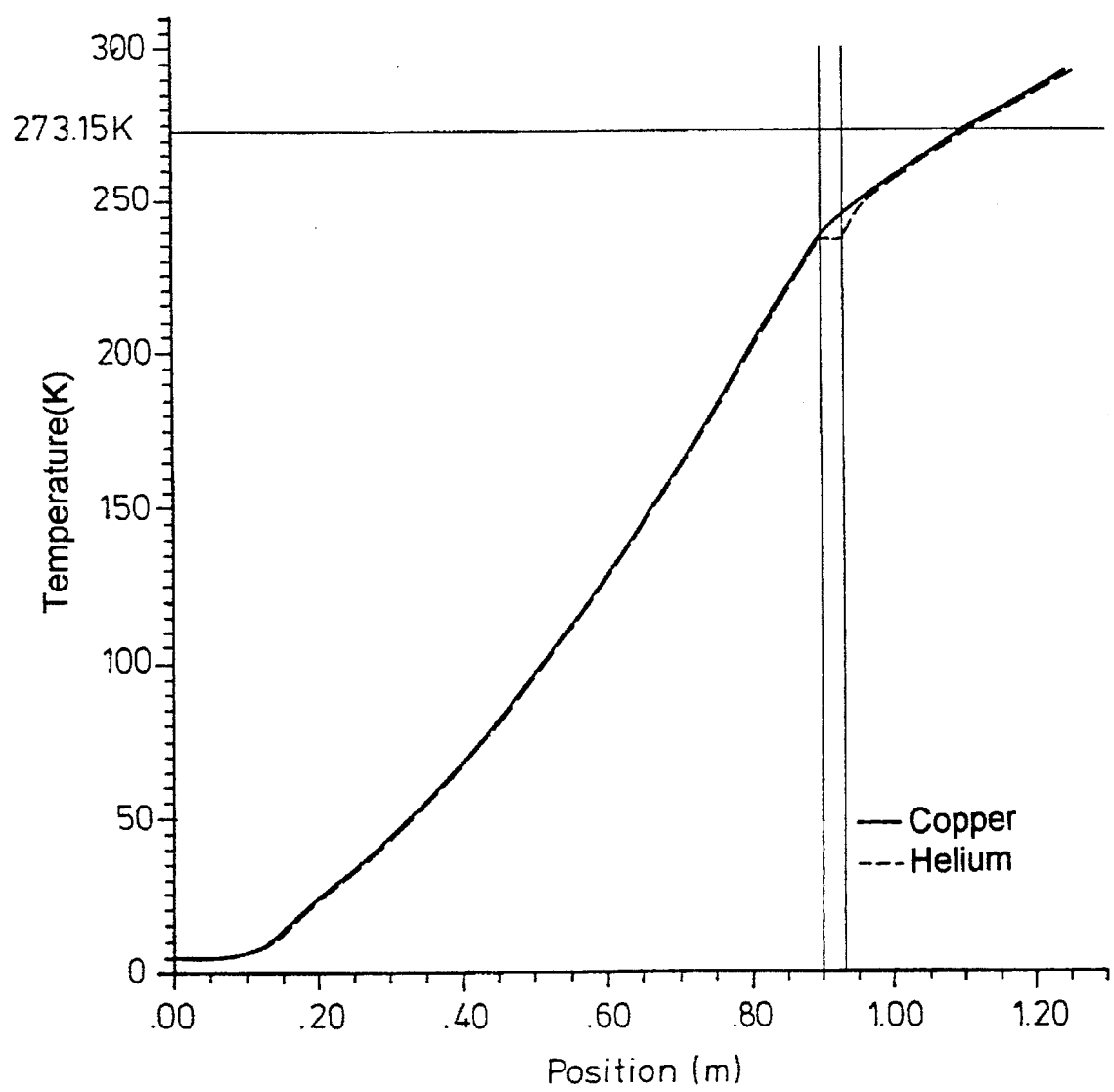
FIG. 3a shows the temperature distribution, without heat exchanger, at the warm end of the current supply structure with a 50 kA current flowing therethrough.
Figure 3B:
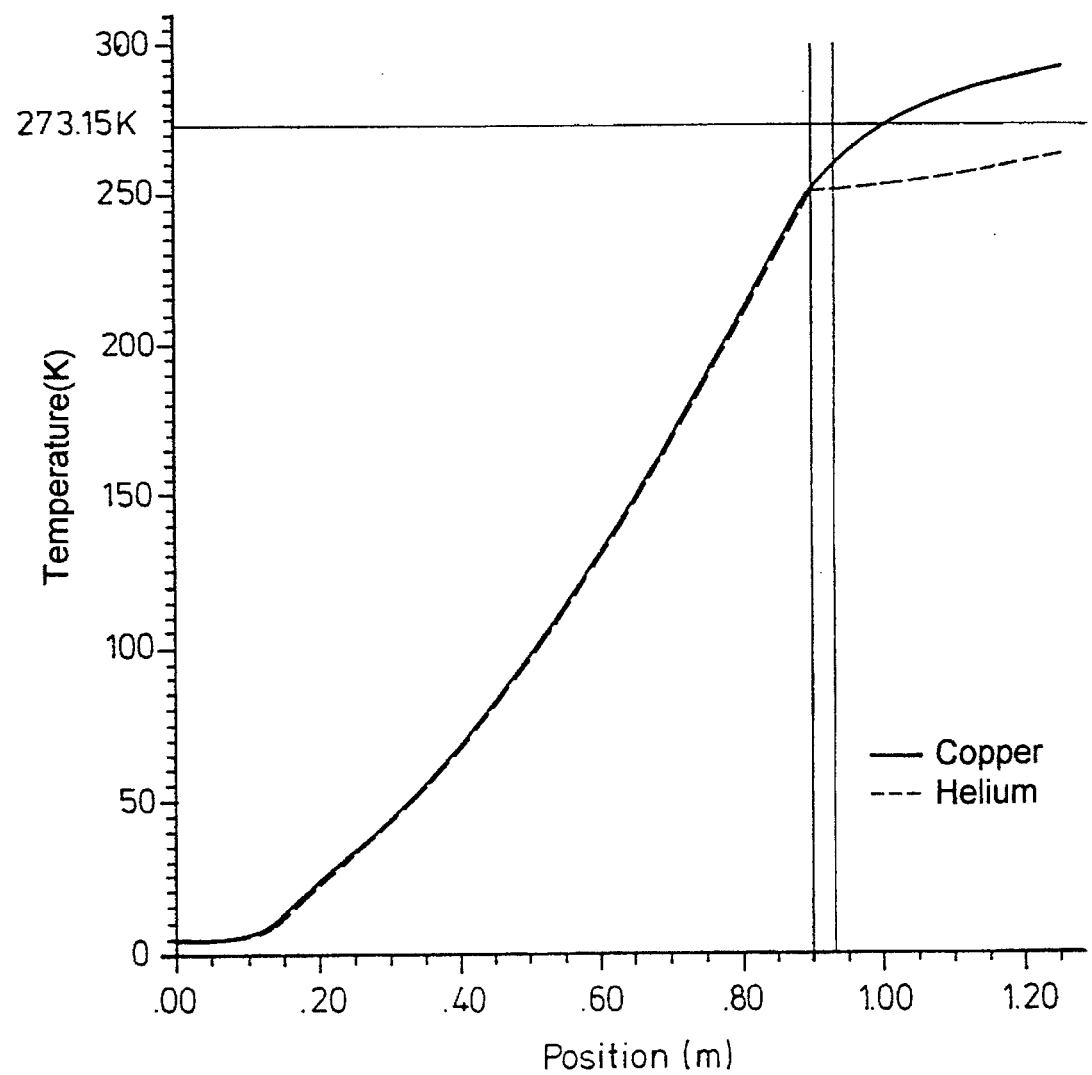
FIG. 3b shows the temperature distribution, with heat exchanger, at the warm end of the current supply structure also with a 50 kA current flowing therethrough.

The heat exchanger 6 as provided in accordance with the invention on the warm end of the current transfer structure eliminates ice formation by condensation at the warm end of the conductor structure also during operation without current flow as can be taken from FIG. 3a. Except for the transition area 5, the temperatures of the coolant and of the current conductor are almost the same. As shown in FIGS. 3a and 3b the temperature in the arrangement according to the invention is permitted to rise faster up to the transition area as the warm end of the conductor is cooled and therefore is not overheated so that its temperature is maintained mostly above the condensation point and this is achieved by good heat transfer with a relatively small coolant flow. This also is an important feature of the design layout of the cooling equipment for large superconductive equipment.

LISTING OF REFERENCE NUMERALS

1 Current transfer structure
2 Conductor

3 First heat exchange region
4 Second heat exchange region
5 Transition region
6 Heat exchange region
7 Connector
8 Conductor surface
9 Disc
10 Perforations
11 Coolant
12 Concentric tube
13 Conductor axis
14 Hollow cylindrical conductor
15 Bore
16 Truncated cone structure
17 Warm end
18 Cold end
19 Disc

What is claimed is:

1. A low-temperature current transfer structure having a cold end for connection to a supercooled superconductive component and a warm end for connection to a current supplying electric bus comprising:

a current conductor extending over a full length of said structure;

a cold end heat transfer region, wherein said current conductor consists of superconductive and normally conductive materials and has a predetermined cross section;

an intermediate heat transfer region adjacent to said cold end heat transfer region, wherein said current conductor has the same cross-section as said current conductor in said cold end heat transfer region and consists of normally conductive material;

a transition region adjacent to said intermediate heat transfer region, wherein said transition region consists of a portion of said conductor having an outside diameter increasing over a predetermined axial length;

a warm end heat transfer region adjacent to said transition region, wherein said conductor has a hollow cylindrical portion with a predetermined wall thickness and consists of normally conductive material;

perforated annular metallic discs arranged coaxially around said conductor in said cold end and said intermediate heat transfer regions in predetermined axially spaced relationship from one another and in good heat transfer contact with an outer wall of said conductor;

perforated metallic discs arranged in said hollow cylindrical portion in axially spaced relationship and in good heat transfer contact with an interior wall of said hollow cylindrical portion;

a tube enveloping said annular metallic discs in said cold end and said intermediate heat transfer regions and providing a coolant path for guiding a coolant through said annular discs along said conductor to said transition region, said transition region having passages for guiding said coolant from said coolant path into said perforated metallic discs of said hollow cylindrical portion, so that said coolant is heated essentially to ambient temperature without formation of condensation or ice on an outer surface of said hollow cylindrical portion; and an electrical connector connected to an outside of said hollow cylindrical portion in said warm end heat transfer region such that said hollow cylindrical portion extends beyond said electrical connector whereby a connector area will be cooled and the coolant can be heated within said hollow cylindrical portion close to ambient temperature.

2. A current transfer structure according to claim 1, wherein said perforated annular metallic discs and said perforated metallic discs consist of a highly heat conductive material.

3. A current transfer structure according to claim 1, wherein said perforated annular metallic discs are soldered or welded directly to said outer wall of the conductor so as to provide for good heat transfer from the conductor to said perforated annular metallic discs.

4. A current transfer structure according to claim 1, wherein said hollow cylindrical portion of said warm end heat transfer region, said transition region and said conductor in said intermediate heat transfer region consist of same material and are integral with one another without interruption.

* * * * *